Figure 1:
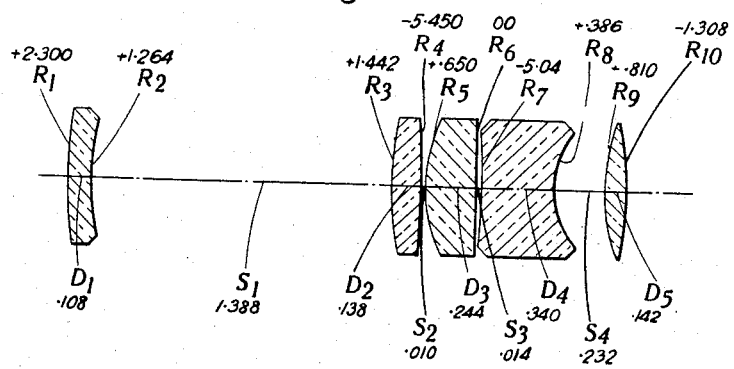

Oct. 13, 1942.   A. WARMISHAM   2,298,853
OPTICAL OBJECTIVES
Filed Nov. 5, 1940

INVENTOR
A. WARMISHAM
BY Blair + Kilcoyne
ATTORNEYS

Patented Oct. 13, 1942

2,298,853

UNITED STATES PATENT OFFICE 2,298,853

OPTICAL OBJECTIVE

Arthur Warmisham, Leicester, England, assignor to Taylor, Taylor & Hobson Limited, Leicester, England, a company of Great Britain Application November 5, 1940, Serial No. 364,453
In Great Britain November 9, 1939

11 Claims. (Cl. 88—57)

This invention relates to optical objectives for photographic or projection or like purposes, consisting of a lens system which is corrected for spherical aberration, coma, astigmatism and distortion and includes an asymmetrical divergent component located behind two convergent components and in front of another convergent component, each of the four components being in the form of a simple element, i. e. consisting of a single piece of glass. It should be made clear that the side of the longer conjugate is herein regarded as the "front" of the objective in accordance with the normal convention.

In a known objective of this kind, in order to obtain a large relative aperture, say F/1.4, the glass used for the divergent element has a mean refractive index substantially greater than 1.65 and the radius of curvature of the front surface of such element is at least ten times that of the rear surface thereof. Such objective has a comparatively small ratio, for example 40%, between back focal length and equivalent focal length. This fact in practice imposes a minimum limit on the focal length which may be employed in a camera.

The present invention has for its object to provide an improved objective having a larger ratio between back focal length and equivalent focal length, whereby an objective of shorter focal length can be employed in the camera or alternatively with an objective of the same focal length more space is available between the objective and the focal plane.

This is achieved according to the invention by mounting in front of an objective of the kind above mentioned a divergent member in the form of a simple meniscus element having both its surfaces convex towards the front. The objective according to the invention therefore comprises five simple elements separated by air spaces, of which the first and fourth (counting from the front) are divergent elements and the other three are convergent elements, the front divergent element consisting of a meniscus lens with both surfaces convex towards the front, whilst the front surface of the other divergent element has a radius of curvature greater than that of the rear surface thereof.

The air space between the front two elements has an axial length not less than 1 and not greater than 3.5 times the equivalent focal length of the whole objective. The focal length of the front divergent element is greater than 1.5 and less than 6 times the equivalent focal length of the whole objective. Conveniently the glass used for the front divergent element has an Abbé V number greater than 55.

The radius of curvature of the front surface of the fourth element is preferably greater than 3.5 times the equivalent focal length of the whole objective, and may be greater than 10 times that of the rear surface of such element. Conveniently the glass used for the fourth element has a mean refractive index greater than 1.65 and preferably also an Abbé V number substantially less than 33.5. The air separation between the front surface of the fourth element and the convergent element in front of it may be greater than 10% of the equivalent focal length of the whole objective.

Figure 2:
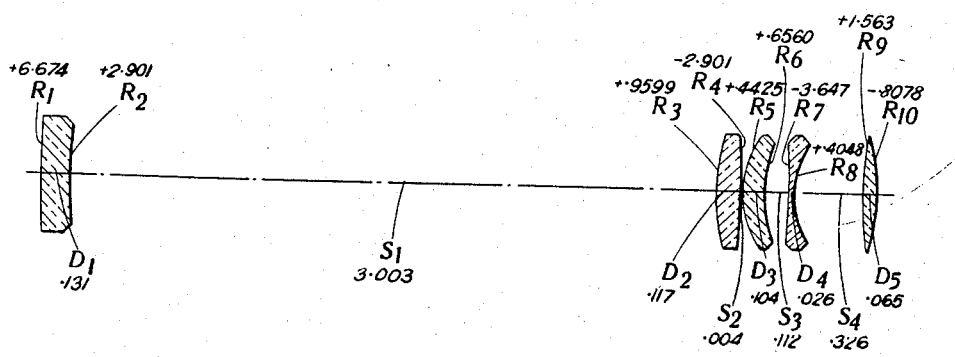

Figures 1 and 2 of the accompanying drawing respectively show in axial section two convenient examples of objective according to the invention and numerical data for these examples are set out in the tables below. In these tables $R_1$, $R_2$ . . . designate the radii of curvature of the various lens surfaces counting from the front (the positive sign indicating that the surface is convex towards the front and the negative that it is concave thereto), $D_1$, $D_2$ . . . designate the axial thicknesses of the individual lens elements and $S_1, S_2 \ldots$ the axial air spaces between the elements. The tables also give the refractive indices $n_D$ for the D-line and the Abbé V numbers of the glasses used for the elements.

*Example I*

Equivalent focal length 1.000.  Relative aperture F/1.4

| Radius | Thickness or separation | Refractive index $n_D$ | Abbé V number |
|---|---|---|---|
| $R_1 = +2.330$ | | | |
|  | $D_1 = .108$ | 1.5158 | 64.1 |
| $R_2 = +1.264$ | | | |
|  | $S_1 = 1.388$ | | |
| $R_3 = +1.442$ | | | |
|  | $D_2 = .138$ | 1.6125 | 59.4 |
| $R_4 = -5.450$ | | | |
|  | $S_2 = .010$ | | |
| $R_5 = +.650$ | | | |
|  | $D_3 = .244$ | 1.6125 | 59.4 |
| $R_6 = \infty$ | | | |
|  | $S_3 = .014$ | | |
| $R_7 = -5.04$ | | | |
|  | $D_4 = .340$ | 1.6973 | 30.5 |
| $R_8 = +.386$ | | | |
|  | $S_4 = .232$ | | |
| $R_9 = +.810$ | | | |
|  | $D_5 = .142$ | 1.6216 | 60.2 |
| $R_{10} = -1.308$ | | | |

*Example II*

Equivalent focal length 1.000.  Relative aperture F/2.0

| Radius | Thickness or separation | Refractive index $n_D$ | Abbé V number |
|---|---|---|---|
| $R_1 = +6.674$ | | | |
|  | $D_1 = .131$ | 1.518 | 60.3 |
| $R_2 = +2.901$ | | | |
|  | $S_1 = 3.003$ | | |
| $R_3 = +.9599$ | | | |
|  | $D_2 = .117$ | 1.613 | 59.3 |
| $R_4 = -2.901$ | | | |
|  | $S_2 = .004$ | | |
| $R_5 = +.4425$ | | | |
|  | $D_3 = .104$ | 1.613 | 59.3 |
| $R_6 = +.6560$ | | | |
|  | $S_3 = .112$ | | |
| $R_7 = -3.647$ | | | |
|  | $D_4 = .026$ | 1.697 | 30.5 |
| $R_8 = +.4048$ | | | |
|  | $S_4 = .326$ | | |
| $R_9 = +1.563$ | | | |
|  | $D_5 = .065$ | 1.613 | 59.3 |
| $R_{10} = -.8078$ | | | |

It will be noticed that in both examples the front air space $S_1$ is greater than the equivalent focal length and less than 3.5 times such length, $R_7$ is greater than 3.5 times the equivalent focal length and the Abbé V number of the glass for the front element is greater than 55.

In Example I the mean refractive index of the glass used for the fourth element is substantially greater than 1.65 and $R_7$ is greater than 10 $R_8$. In this example the focal length of the front element alone is $-5.44$ times the equivalent focal length of the whole objective. The ratio of the back focal length to the equivalent focal length is between 49% and 50%.

In Example II the glass used for the fourth element has a mean refractive index substantially greater than 1.65 and an Abbé V number substantially less than 33.5, whilst the air space between the second and third elements is greater than 10% of the equivalent focal length. The focal length of the front element alone is in this instance about $-10$ times the equivalent focal length of the whole objective. The ratio of the back focal length to the equivalent focal length in this example is approximately 80%.

What I claim as my invention and desire to secure by Letters Patent is:

1. An optical objective corrected for spherical aberration, coma, astigmatism and distortion and comprising five axially aligned simple lens elements separated by air spaces of which the first and the fourth (counting from the front) are divergent elements whilst the other three are convergent elements, the front divergent element consisting of a meniscus lens with both surfaces convex towards the front and having a focal length numerically greater than 1.5 and less than 6 times the equivalent focal length of the whole objective, whilst the front surface of the other divergent element has a radius of curvature greater than that of the rear surface thereof, the air space between the front two elements having an axial length not less than the equivalent focal length of the objective and not greater than 3.5 times the equivalent focal length.

2. An objective as claimed in claim 1, in which the glass used for the front divergent element has an Abbé V number greater than 55.

3. An objective as claimed in claim 1, in which the glass used for the fourth element has a mean refractive index substantially greater than 1.65 and an Abbé V number substantially less than 33.5.

4. An objective as claimed in claim 1, in which the glass used for the front divergent element has an Abbé V number greater than 55, whilst that used for the other divergent element has a mean refractive index greater than 1.65 and an Abbé V number less than 33.5.

5. An objective as claimed in claim 1, in which the glass used for the fourth element has a mean refractive index greater than 1.65 and an Abbé V number less than 33.5, whilst the radius of curvature of the front surface of such element is greater than ten times that of the rear surface thereof.

6. An objective as claimed in claim 1, in which the radius of curvature of the front surface of the fourth element is greater than 3.5 times the equivalent focal length of the whole objective.

7. An objective as claimed in claim 1, in which the glass used for the front divergent element has an Abbé V number greater than 55, whilst that used for the other divergent element has a mean refractive index greater than 1.65 and an Abbé V number less than 33.5, the radius of curvature of the front surface of the fourth element being greater than 3.5 times the equivalent length of the whole objective.

8. An objective as claimed in claim 1, in which the axial length of the air space between the third and fourth elements is not less than 10% and not greater than 25% of the equivalent focal length of the whole objective.

9. An objective as claimed in claim 1, in which the glass used for the front divergent element has an Abbé V number greater than 55, whilst that used for the other divergent element has a mean refractive index greater than 1.65 and an Abbé V number less than 33.5, the axial length of the air space between the third and fourth elements being not less than 10% and not greater than 25% of the equivalent focal length of the whole objective.

10. An optical objective having numerical data substantially as set forth in the following table:

Equivalent focal length 1.000.   Relative aperture F/1.4

| Radius | Thickness or separation | Refractive index $n_D$ | Abbé V number |
|---|---|---|---|
| $R_1=+2.300$ | | | |
| | $D_1=.108$ | 1.5158 | 64.1 |
| $R_2=+1.264$ | | | |
| | $S_1=1.388$ | | |
| $R_3=+1.442$ | | | |
| | $D_2=.138$ | 1.6125 | 59.4 |
| $R_4=-5.450$ | | | |
| | $S_2=.010$ | | |
| $R_5=+.650$ | | | |
| | $D_3=.244$ | 1.6125 | 59.4 |
| $R_6=\infty$ | | | |
| | $S_3=.014$ | | |
| $R_7=-5.04$ | | | |
| | $D_4=.340$ | 1.6973 | 30.5 |
| $R_8=+.386$ | | | |
| | $S_4=.232$ | | |
| $R_9=+.810$ | | | |
| | $D_5=.142$ | 1.6216 | 60.2 |
| $R_{10}=-1.308$ | | | | wherein $R_1$, $R_2$ . . . designate the radii of curvature of the lens surfaces, $D_1$, $D_2$ . . . the axial thicknesses of the lens elements and $S_1$, $S_2$ . . . the axial air spaces between the elements.

11. An optical objective having numerical data substantially as set forth in the following table:

Equivalent focal length 1.000.   Relative aperture F/2.0

| Radius | Thickness or separation | Refractive index $n_D$ | Abbé V number |
|---|---|---|---|
| $R_1=+6.674$ | | | |
| | $D_1=.131$ | 1.518 | 60.3 |
| $R_2=+2.901$ | | | |
| | $S_1=3.003$ | | |
| $R_3=+.9599$ | | | |
| | $D_2=.117$ | 1.613 | 59.3 |
| $R_4=-2.901$ | | | |
| | $S_2=.004$ | | |
| $R_5=+.4425$ | | | |
| | $D_3=.104$ | 1.613 | 59.3 |
| $R_6=+.6560$ | | | |
| | $S_3=.112$ | | |
| $R_7=-3.647$ | | | |
| | $D_4=.026$ | 1.697 | 30.5 |
| $R_8=+.4048$ | | | |
| | $S_4=.326$ | | |
| $T_9=+1.563$ | | | |
| | $D_5=.065$ | 1.613 | 59.3 |
| $R_{10}=-.8078$ | | | | wherein $R_1$, $R_2$ . . . designate the radii of curvature of the lens surfaces, $D_1$, $D_2$ . . . the axial thicknesses of the lens elements and $S_1$, $S_2$ . . . the axial air spaces between the elements.

ARTHUR WARMISHAM.